United States Patent [19]

Morishita

[11] Patent Number: 5,590,585

[45] Date of Patent: Jan. 7, 1997

[54] BREAD MAKER

[75] Inventor: Isaya Morishita, Daito, Japan

[73] Assignee: Funai Electric Co., Ltd., Japan

[21] Appl. No.: 654,123

[22] Filed: May 28, 1996

[30] Foreign Application Priority Data

May 29, 1995 [JP] Japan ................. 7-154009

[51] Int. Cl.⁶ .............. A21B 1/00; A21D 8/00; A47J 27/00; A47J 37/00
[52] U.S. Cl. .............. 99/327; 99/348; 99/468; 366/98; 366/146; 366/314; 366/601
[58] Field of Search ............ 99/325–328, 329 R, 99/331–333, 337, 338, 348, 352–355, 467, 468, 483, 484, 486; 366/69, 96–98, 144–147, 601, 314; 426/504, 512; 219/492, 497, 507; 364/400, 557, 143

[56] References Cited

U.S. PATENT DOCUMENTS

| 4,538,509 | 9/1985 | Ojima et al. | 99/348 |
| 4,776,265 | 10/1988 | Ojima | 99/468 X |
| 4,957,040 | 9/1990 | Nakakura et al. | 99/331 X |
| 4,984,512 | 1/1991 | Takahashi et al. | 99/327 |
| 5,351,606 | 10/1994 | Matsuzaki | 366/98 X |
| 5,363,746 | 11/1994 | Gordon | 99/328 |
| 5,415,081 | 5/1995 | Yoshida et al. | 99/326 |
| 5,426,580 | 6/1995 | Yoshida et al. | 364/143 |
| 5,433,139 | 7/1995 | Kitagawa et al. | 99/327 |
| 5,435,235 | 7/1995 | Yoshida | 99/327 |
| 5,466,913 | 11/1995 | Tanimoto et al. | 219/492 |
| 5,528,979 | 6/1996 | Yoshida | 366/601 X |
| 5,531,153 | 7/1996 | Maruyama et al. | 99/327 |

FOREIGN PATENT DOCUMENTS 7-44906  5/1995  Japan.

Primary Examiner—Timothy F. Simone
Attorney, Agent, or Firm—Bacon & Thomas

[57] ABSTRACT

A bread maker having a reference value setting section for updating a reference value corresponding to a target temperature every heater-on/off control operation, the reference value serving to stabilize a current temperature to the target temperature by comparing the current temperature with the reference value and controlling a heater on the basis of a temperature difference between the current temperature and the reference value.

5 Claims, 11 Drawing Sheets

FIG. 2

| CONDITION SUCH AS AMBIENT TEMPERATURE AND BREAD MAKING PROCESS | TRANSITION CHARACTERISTIC DATA OF HEATER CONTROL REFERENCE VALUES FOR EACH HEATER-ON/OFF OPERATION | | | | | |
|---|---|---|---|---|---|---|
| A1 | S1 | OFF | ON | OFF | ON | OFF | ... |
| | | R0 | R1 | R2 | R3 | R4 | ... RN |
| A2 | S2 | OFF | ON | OFF | ON | OFF | ... |
| | | Q0 | Q1 | Q2 | Q3 | Q4 | ... QN |
| A3 | S3 | OFF | ON | OFF | ON | OFF | ... |
| | | P0 | P1 | P2 | P3 | P4 | ... PN |
| ⋮ | ⋮ | ⋮ | | | | | |
| AN | SN | OFF | ON | OFF | ON | OFF | ... |
| | | M0 | M1 | M2 | M3 | M4 | ... MN |

| SENSOR POSITION / JUDGMENT ITEM | (A) | (B) | (C) | (D) |
|---|---|---|---|---|
| TEMPERATURE FLUCTUATION RANGE | ±7~±6.5°C | ±7~±7°C | ±7~±6°C | ±7~±12.5°C |
| NUMBER OF TIMES OF TURNING ON HEATER | 10 | 14 | 16 | 19 |
| TEMPERATURE DIFFERENCE IN OVEN | 113°C | 121°C | 108°C | 106°C |
| EVALUATION POINTS | 3 | 3 | 10 | 8 |
| $X_1 - X_2$ | 3 | 7 | 9 | 4 |

BREAD MAKER

BACKGROUND OF THE INVENTION

The invention relates to a bread maker whose temperature control response is improved.

FIG. 8 is a sectional view showing a construction of a conventional bread maker A. In FIG. 8, reference numeral 1 designates a cylindrical baking oven main body; 2, an operation panel that is arranged in the middle of the front of the baking oven main body 1 for specifying a baking time and a finishing condition; and 3, a dome-like glass cover mounted on top of the baking oven main body 1 so as to be opened and closed. The baking oven main body 1 and the glass cover 3 provide a closed space of the bread maker. The operation panel 2 has a menu select button, a menu set button, a start button, and the like. In this bread maker, the glass cover 3 is constructed of transparent glass so that the inside of the baking oven main body 1 can be seen through with the glass cover 3 closed. The glass cover 3 is rotatably attached to a bracket 4 at the rear end thereof, the bracket 4 being mounted on the baking oven main body 1. The glass cover 3 also has a handle 5 attached to the front end thereof so that the glass cover 3 can be opened and closed. Inside the baking oven main body 1 is a cylindrical inner case 8. Further, an operation board 9 having a display corresponding to the operation panel 2, a keystroke drive section, and the like is arranged. A circuit board 10 for effecting the entire control is also arranged.

An internal temperature sensor 17 and a heat-ray radiation type heater 12 serving as an electrically heating element are secured to the inner circumferential surface of the inner case 8 in annular form. Inside the inner case 8 are a bread baking case 13 and a stirring blade 14. The bread baking case 13 is a cylindrical case whose top is opened. The stirring blade 14 mixes and kneads bread making ingredients including water charged into the bread baking case 13. The stirring blade 14 is rotatably arranged on the bottom of the case 8. Further, a dough sensor 11 for detecting the temperature of the ingredients during the stirring process is attached to the stirring blade 14. A stirring motor 16 is fixed below the baking oven main body 1, so that the stirring blade 14 rotates through pulleys 19a, 19b and a timing belt 20. A projecting rod 15 is attached to the inner wall of the bread baking case 13 lest the dough formed by stirring should rotate together with the stirring blade 14. Reference numeral 25 designates a fan motor; 26, a fan; and 27, a fan heater.

The circuit board 10 has a control circuit 50 for controlling the entire part of the bread maker A. FIG. 9 is a block diagram showing a configuration of the control circuit 50. In FIG. 9, the same or like parts and components as those shown in FIG. 8 are designated by the same reference numerals, and the description thereof will be omitted. In FIG. 9, reference numeral 17 designates an internal temperature sensor, whose comparator compares a detected temperature with a fixed heater control reference value. Further, reference numeral 18 designates a microcomputer for effecting system control; 30, a relay for energizing and deenergizing the heater 12; 33, a relay for energizing and deenergizing the fan heater 27; and 31 and 32, relays for energizing and deenergizing the stirring motor 16 and the fan motor 25, respectively. The microcomputer 18 has ROMs and a RAM as a storage area and an I/O port and an A/D converter port as an interface. The ROMs include a ROM 52 that stores a control program related to the execution of the respective bread making processes, and a ROM 53 that stores related data.

Reference numeral 51 designates a power supply circuit of the bread maker A, which not only feeds dc power to the control circuit 10 by converting commercial power supply on the primary side into dc power supply, but also feeds ac power to the heater 12, the fan heater 27, the stirring motor 16, and the fan motor 25.

Next, a temperature control operation of the aforementioned bread maker A will be described. FIG. 10 is a flowchart showing the temperature control operation of the bread maker A. A program indicated by the flowchart is located in process control programs requiring temperature control for such processes as stirring, fermenting, and baking processes of the bread maker A. Therefore, the process control programs requiring temperature control can be executed by the program indicated by the flowchart. According to the flowchart, temperature data inside the bread maker detected by the internal temperature sensor 17 is read (Step S100), and the read temperature data is compared with a reference value corresponding to a desired target temperature Ta (Step S101). As a result, if the read temperature data is judged to be lower than the reference value corresponding to the target temperature Ta, then the heater 12 is turned on to start conduction to the heater 12 (Step S103). On the other hand, if the temperature data read in Step S101 is judged to be higher than the reference value corresponding to the target temperature Ta, then either the heater 12 that has been turned on is turned off to stop conduction to the heater 12 or no conduction is made to the heater 12 (Step S102).

Therefore, in temperature control for heating the bread baking case 13, when the heating of the heater 12 that has been left cold is started to cause the temperature of the bread baking case 13 to be increased by the heater 12, the internal temperature sensor 17 detects such temperature increase, and in response thereto, the microcomputer 18 effects automatic on/off control of the heater 12 so that the temperature of the bread baking case 13 reaches the target temperature Ta as shown in FIG. 11.

As shown in FIG. 11, a sensor curve x shown by the solid line indicates the values detected by the internal temperature sensor 17, whereas a temperature curve y shown by the broken line indicates actual temperatures of the bread. The temperature curve y is initially fluctuating with large overshoot and undershoot but is gradually stabilized with the fluctuations controlled within a predetermined range D. The actual surface temperature of the bread is rather high and is away from the target temperature Ta in the initial part of the temperature curve y in particular as shown in FIG. 11 due to the heat capacity of various parts and components of the bread maker.

As described above, the heater 12 is controlled on the basis of a fixed heater control reference value corresponding to a set target temperature.

The conventional bread maker A is constructed as described above. That is, the heating control of the bread baking case 13 in particular involves the steps of reading the temperature data inside the bread maker detected by the internal temperature sensor 17, and comparing the read temperature data with a fixed reference value corresponding to a target temperature Ta. As a result of such heating control, the temperature fluctuates not only with large overshoot and undershoot at an initial temperature control period but also within a large range even at the steady state as shown in FIG. 11. Therefore, temperature control with satisfactory response and high accuracy within a small fluctuating range has not been achieved.

SUMMARY OF THE INVENTION

The invention has been made to overcome the aforementioned problem. An object of the invention is therefore to provide a bread maker capable of effecting high-response and high-accuracy temperature control by correcting a heat conduction time delay due to thermal inertia, reducing overshoot and undershoot, and suppressing fluctuations within a small range.

Another object of the invention is to provide a bread maker capable of effecting high-response and high-accuracy temperature control by reducing overshoot and undershoot and suppressing fluctuations within a small range while locating an internal temperature sensor at an optimal position.

To achieve the above object, an aspect of the invention provides a bread maker comprising: a baking oven main body; a bread baking case set in the baking oven main body; a heater for heating the bread baking case; an internal temperature sensor for detecting a heating temperature of the bread baking case; temperature control means for comparing a current value of the heating temperature with a reference value corresponding to a target temperature and performing a heater-on/off control operation based on a difference between the current value of the heating temperature and the reference value to adjust the current value to the target temperature, the temperature control means controlling the heating temperature in a mixing and kneading process, a fermenting process, and a baking process; and reference value setting means for updating the reference value corresponding to the target temperature so as to be a different value from the target temperature every heater-on/off control operation, to cause the reference value to turn off the heater before the heating temperature reaches the target temperature when the heating temperature is increasing based on the heater-on control operation, and to cause the reference value to turn on the heater before the heating temperature reaches the target temperature when the heating temperature is decreasing based on the heater-off control operation.

Another aspect of the invention provides a bread maker comprising: a baking oven main body; an opening/closing cover mounted on an uppermost end of the baking oven main body; a bread baking case set in the baking oven main body; a heater for heating the bread baking case; an internal temperature sensor for detecting a heating temperature of the bread baking case; and temperature control means for comparing a current value of the heating temperature with a reference value corresponding to a target temperature, and performing a heater-on/off control operation based on a difference between the current value of the heating temperature and the reference value, to adjust the current value to the target temperature, wherein the internal temperature sensor is mounted at a position where a value obtained by subtracting a maximum value of a temperature fluctuation range of the heating temperature with respect to the target temperature from the number of times of tuning on the heater for a predetermined period is substantially the largest.

BRIEF DESCRIPTION OF THE DRAWINGS

FIG. 2 is a diagram illustrative of a transition characteristic data table stored in a ROM of the control circuit of the bread maker shown in FIG. 1;

FIG. 7 is a data table for generally judging from points A, B, C and D, such an internal temperature sensor mounting point as to obtain the optimal temperature control characteristic of the bread maker shown in FIG. 5;

DETAILED DESCRIPTION OF THE PREFERRED EMBODIMENTS

First Embodiment

Figure 1:
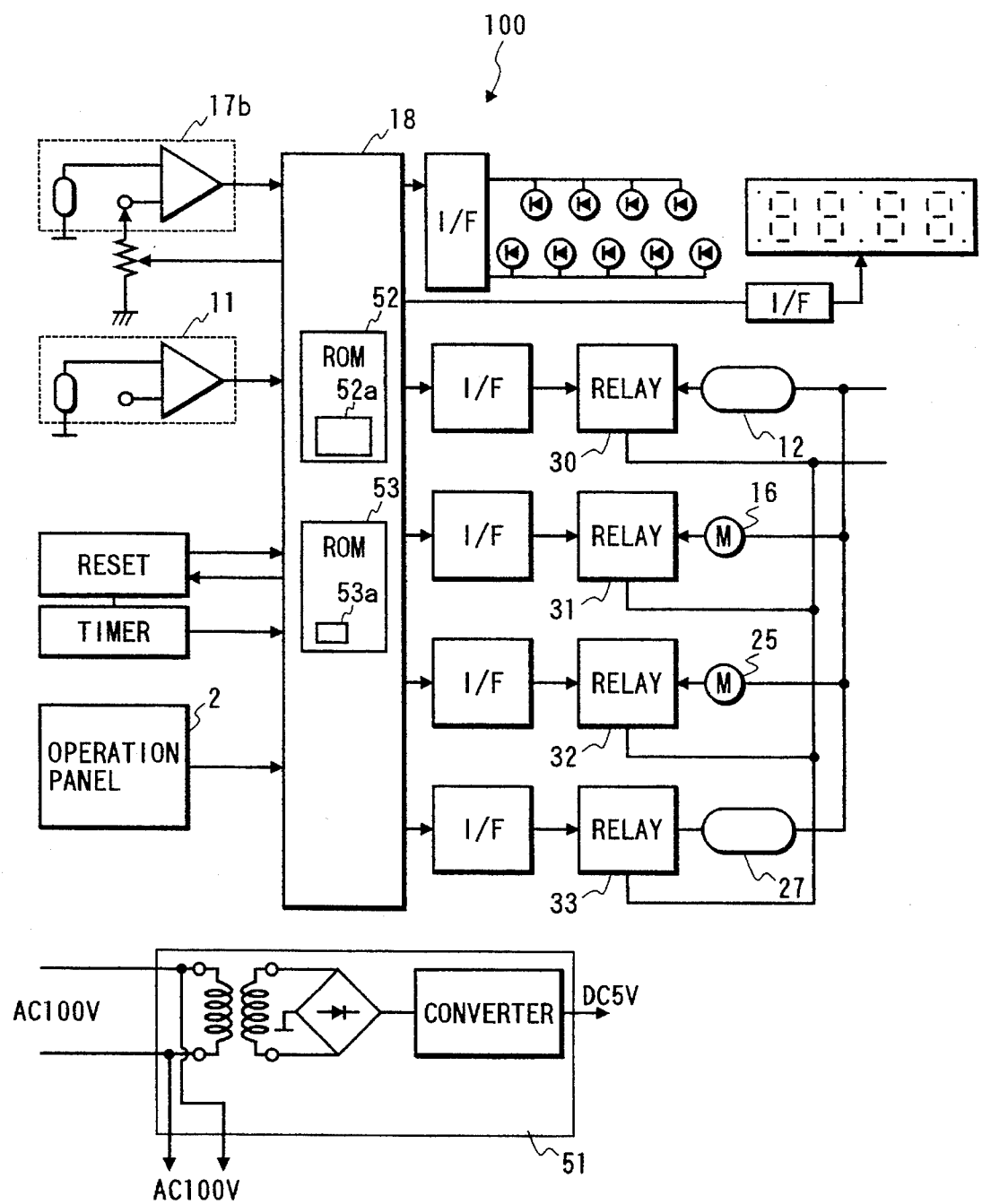
FIG. 1 is a block diagram showing a configuration of a control circuit of a bread maker, which is a first embodiment of the invention.
Figure 9:
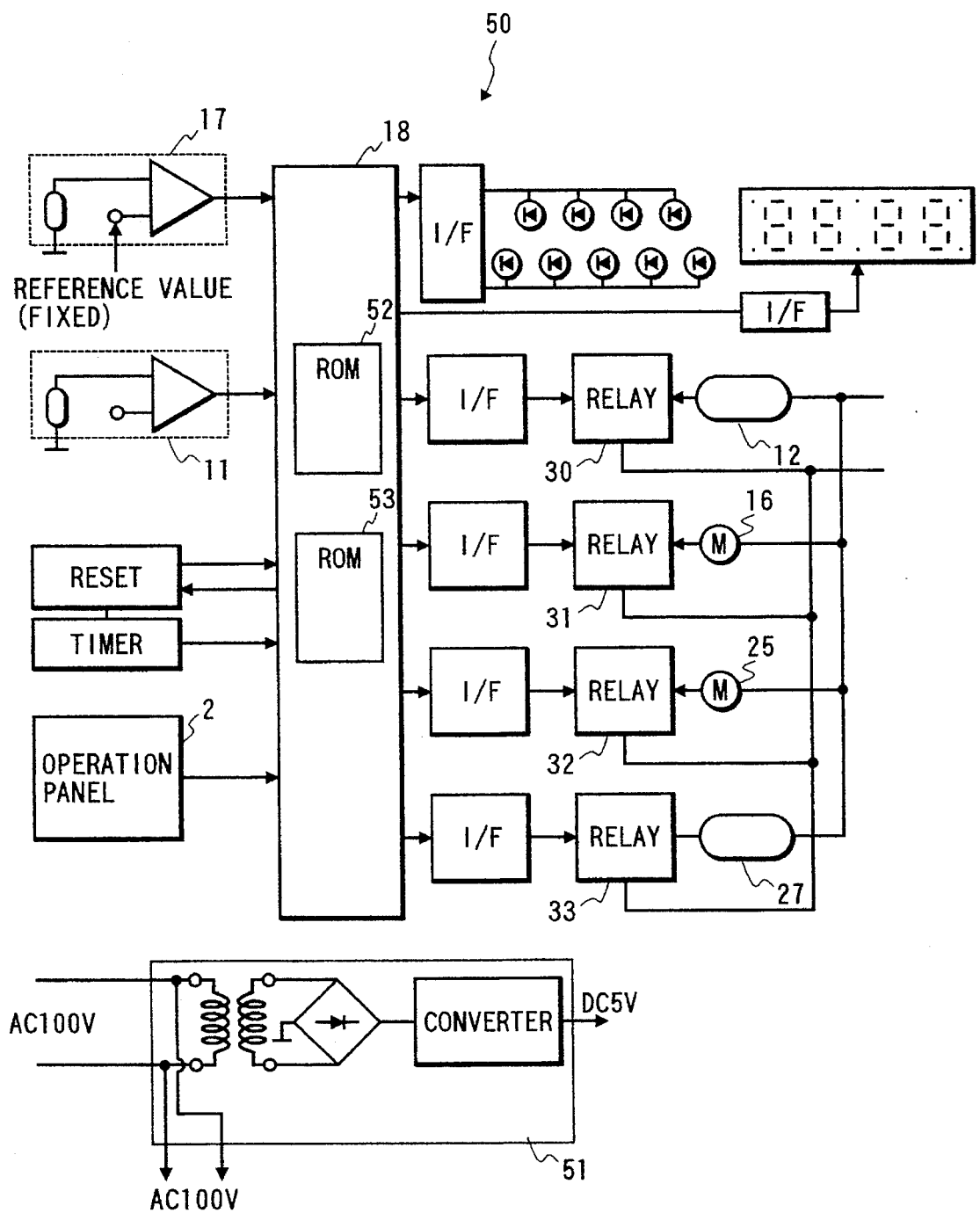
FIG. 9 is a block diagram showing a configuration of a control circuit of the conventional bread maker.
Figure 10:
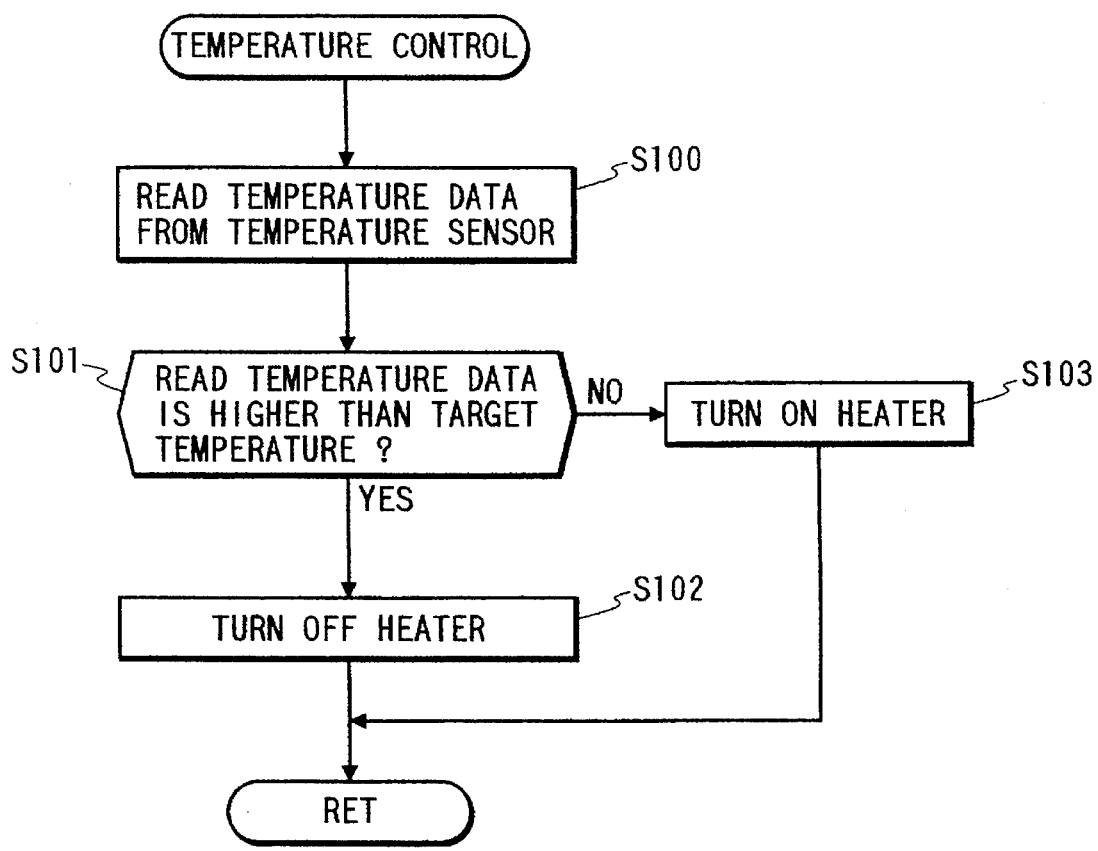
FIG. 10 is a flowchart showing a temperature control operation of the conventional bread maker.

The first embodiment of the invention will be described with reference to the drawings. FIG. 1 is a block diagram showing a configuration of a control circuit 100 of a bread maker B, which is the first embodiment of the invention. The bread maker B has the control circuit 100 in place of the control circuit 50 of the conventional bread maker A. In FIG. 1, the same parts and components as those shown in FIG. 9 are designated by the same reference numerals, and the description thereof will be omitted. In FIG. 1, reference numeral 17b designates an internal temperature sensor, whose comparator compares a detected temperature with a heater control reference value that varies according to a condition. Reference numeral 52a designates a control program that controls various processes to be carried out by the bread maker B. The program is stored in a ROM 52, and includes a temperature control subroutine program shown in FIG. 3. The temperature control subroutine program is called when temperature control is requested in the respective processes executed by the control program. Reference numeral 53a designates a transition characteristic data table having ambient temperature/bread making process conditions A1 to AN, and transition characteristic data S1 to SN of heater control reference values corresponding to the ambient temperature/bread making process conditions A1 to AN, each heater control reference value being updated every heater-on/off operation. The transition characteristic data table is stored in a ROM 53.

FIG. 2 is a diagram illustrative of the arrangement of the transition characteristic data table 53a. In FIG. 2, reference numeral 55 designates conditions A1 to AN such as target temperature Ta, ambient temperature, and bread making process; and 56, heater control reference values used at the time of controlling the temperature of a bread baking case 13 by turning on and off a heater 12 so as to correspond to the conditions A1 to AN, respectively. Each heater control reference value corresponds to each of the conditions A1 to AN, and is updated every heater-on/off operation. In FIG. 2, the transition characteristic data S1 corresponding to the condition A1 is updated so as to form a table consisting of reference values R0 to RN. The heater control reference value R0 corresponds to the initial-off pulse; the heater control reference value R1 to the first on-pulse; the heater control reference value R2 to the first off-pulse; the heater control reference value R3 to the second on-pulse; the heater control reference value R4 to the second off-pulse; and so on. The transition characteristic data S2 corresponding to the condition A2 is updated so as to form a table consisting of reference values Q0 to QN. The transition characteristic data S3 corresponding to the condition A3 is updated so as to form a table consisting of reference values P0 to PN. The transition characteristic data SN corresponding to the condition AN is updated so as to form a table consisting of reference values M0 to MN.

Figure 3:
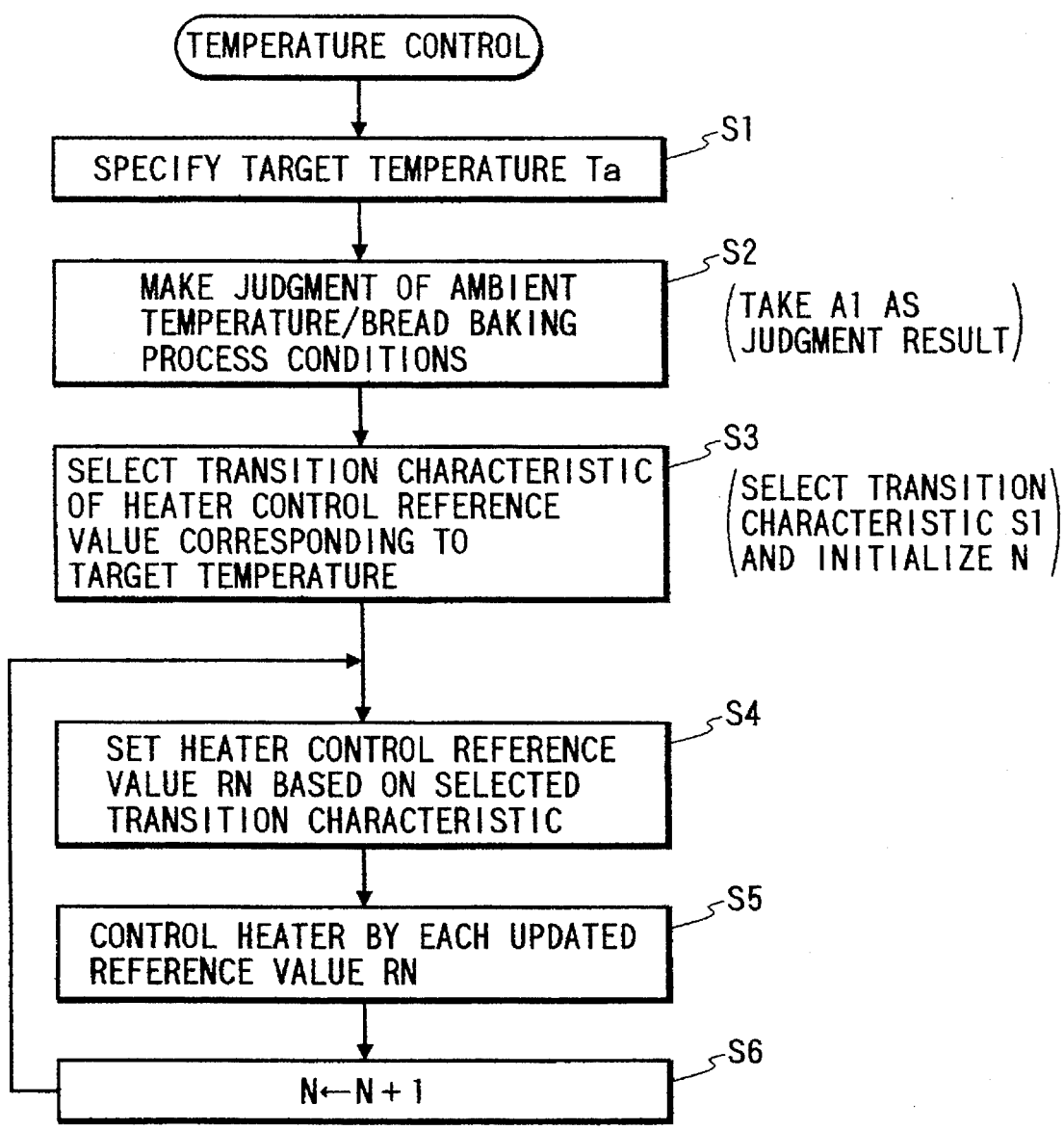
FIG. 3 is a flowchart showing a temperature control operation of the bread maker shown in FIG. 1.

Then, the temperature control operation will be described on the basis of the flowchart shown in FIG. 3. A target temperature Ta is specified for each process (Step S1). The target temperature Ta is, e.g., the optimal bread baking temperature for the bread baking process and is set through an operation panel 2 in advance. Then, judgment of the ambient temperature/bread baking process conditions is made (Step S2). This judgment can be made through an ambient temperature detecting sensor for the ambient temperature condition, and by locating in the control program a process (such as the fermenting process, the bread baking process, and so on) requiring intervention of the temperature control subroutine, for the bread making process condition.

Successively, a transition characteristic of the heater control reference value corresponding to the set target temperature Ta for each heater-on/off operation is selected by referencing the transition characteristic data table 53a based on the judgment of the condition made in Step S2 (Step S3). If it is the condition A1 that has been judged in Step S2, the transition characteristic data of the heater control reference value for each heater-on/off operation is S1 (R0 to RN). Then, the heater control reference value RN is set for each heater-on/off operation based on the transition characteristic data S1 (Step S4), and the heater 12 is controlled by each updated reference value RN (Step S5). Then, 1 is added to N (Step S6), and the operation from Steps S4 to S6 is repeated after setting the updated reference value R(N+1).

Figure 4:
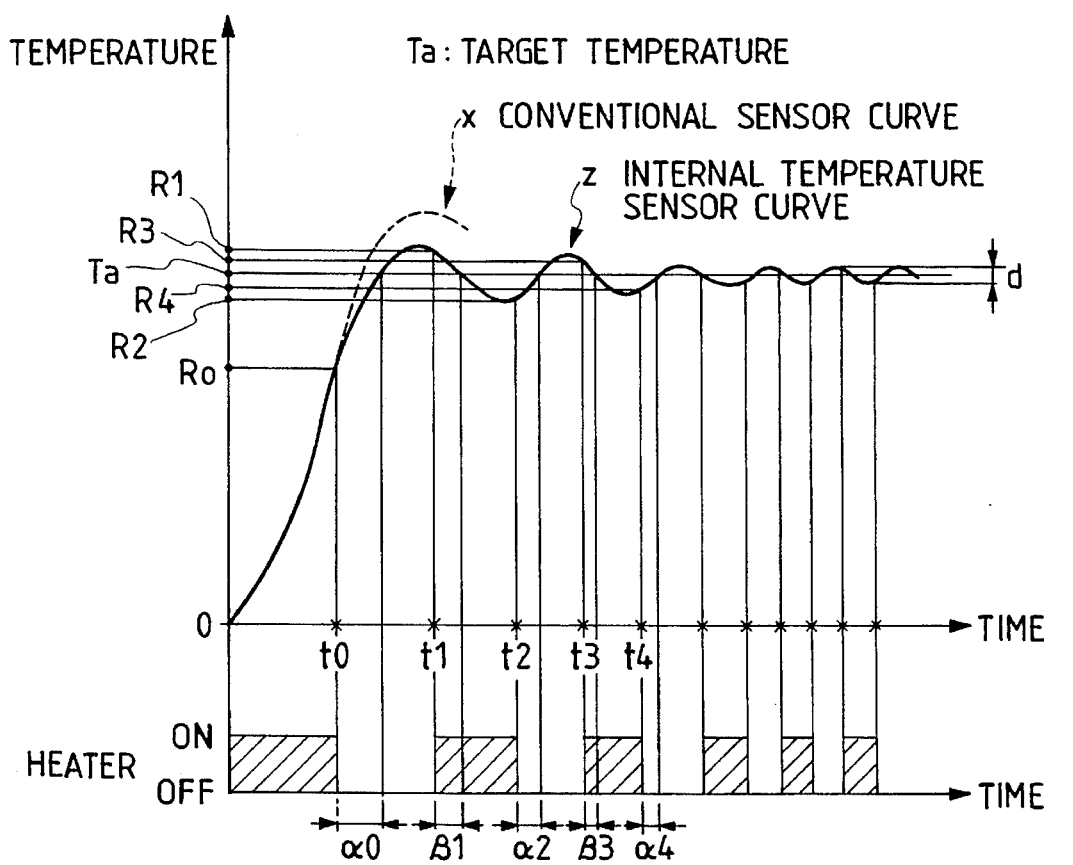
FIG. 4 is a diagram illustrative of a heater-on/off control process in accordance with a heater control reference value set on the basis of the transition characteristic data of the bread maker shown in FIG. 1.

FIG. 4 is a diagram illustrative of an on/off control process of the heater 12 carried out in accordance with the heater control reference values R0, R1, R2, R3, R4, . . . RN that are updated on the basis of the transition characteristic data S1 for every heater-on/off operation in Steps S4 to S6.

First, the heater 12 is turned on. Then, the heater control reference value R0 for the initial off-operation is set for the condition A1 out of the heater control reference transition characteristic data S1 selected from the data 56 in the transition characteristic data table 53a, so that the heater 12 is turned off based on the reference value R0 (at timing t0). Unlike in the conventional example in which the sensor curve x depicts such a rise as shown by the broken line (see FIG. 11), the temperature detected by the internal temperature sensor of the invention exceeds the target temperature Ta with controlled overshoot, makes a turn, and drops from the target temperature Ta as a sensor curve z shown by the solid line. In the meantime, the updated heater control reference value R1 is set, so that the heater is turned on upon coincidence of the detected temperature with R1 (at timing t1) so as to anticipate the turn-on timing. Also, in the meantime, the updated heater control reference value R2 is set, so that the heater is turned off upon coincidence of the detected temperature with R2 (at timing t2) so as to anticipate the turn-off timing. The same operation is repeated for R3 (at timing t3), R4 (at timing t4), . . . RN.

As is apparent from FIG. 4, the heater 12 is turned off at the timings t0, t2, t4, t6, . . . that are the timings before the sensor curve z exceeds the target temperature. That is, the heater-off timing is anticipated to reduce overshoot. The times between the heater-off timings and the timings at which the curve rises and reaches the target temperature, i.e., the anticipating times, are denoted as $\alpha 0, \alpha 2, \alpha 4, \alpha 6, \ldots$. It may be noted that the anticipating time is designed to decrease with increasing number of times of heater-off operations.

On the other hand, the heater 12 is turned on at the timings t1, t3, t5, . . . that are the timings before the sensor curve z drops from the target temperature. That is, the heater-on timing is anticipated to correct a heat transfer time difference. The times between the heater-on timings and the timings at which the curve drops and reaches the target temperature, i.e., the anticipating times, are denoted as $\beta 1, \beta 3, \beta 5, \ldots$. It may be noted that the anticipating time is designed to decrease with increasing number of times of heater-on operations.

Figure 11:
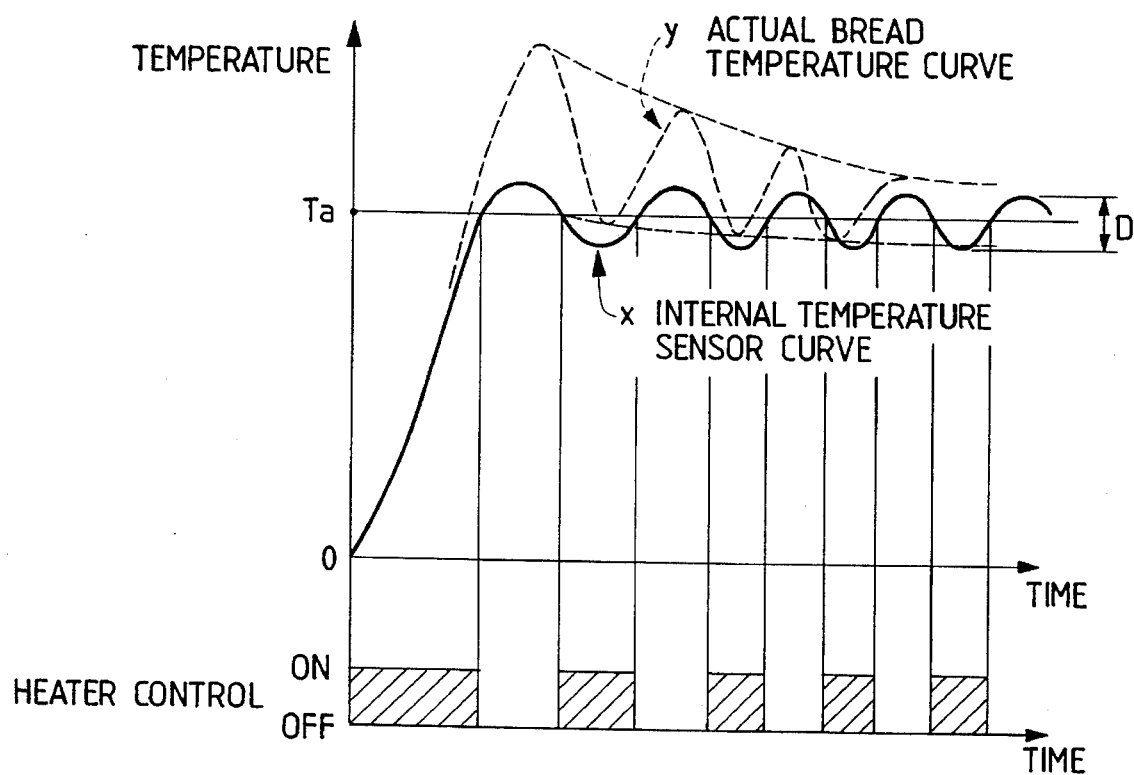
FIG. 11 is a diagram illustrative of a relationship between the heater-on/off control and the internal temperature sensor of the conventional bread maker.

As shown in FIG. 11, unlike the sensor curve x of the internal temperature sensor 17 based on the conventional heater-on/off control using a fixed heater control reference value, the sensor curve z of the internal temperature sensor 17b using the heater control reference value being updated in accordance with the heater control reference transition characteristic data of FIG. 4 exhibits improved temperature control accuracy and response with overshoot and undershoot inherent in the on/off control more suppressed than those in the conventional example shown in FIG. 11 and with the fluctuation range d thereof smaller than the fluctuation range D of the curve x at the steady state.

While the case where the heater temperature control is effected by a microcomputer on a software basis has been described, the temperature control may be effected by a hardware circuit on a real time basis as well.

Second Embodiment

Figure 5:
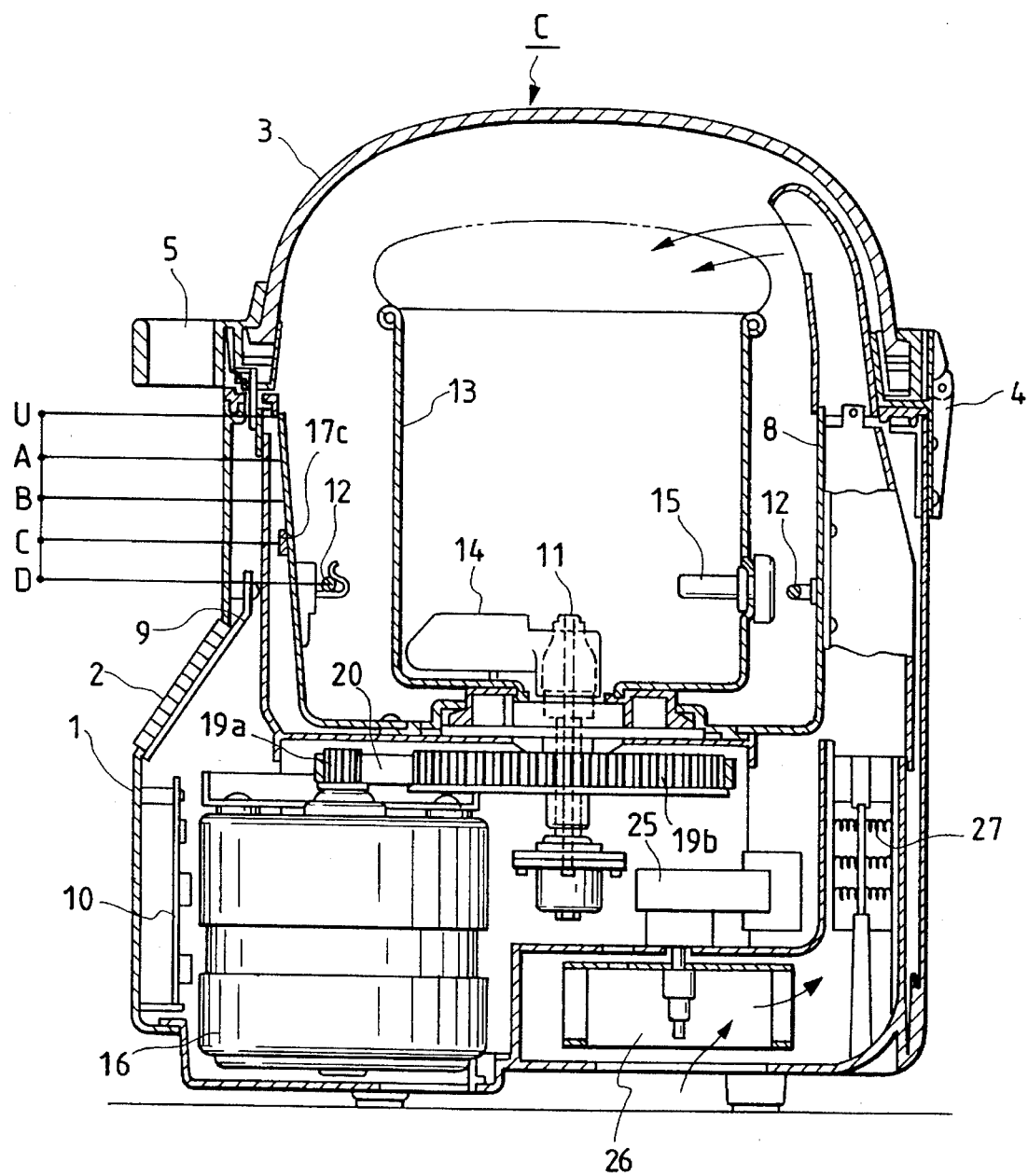
FIG. 5 is a sectional view showing a construction of a bread maker, which is a second embodiment of the invention.
Figure 8:
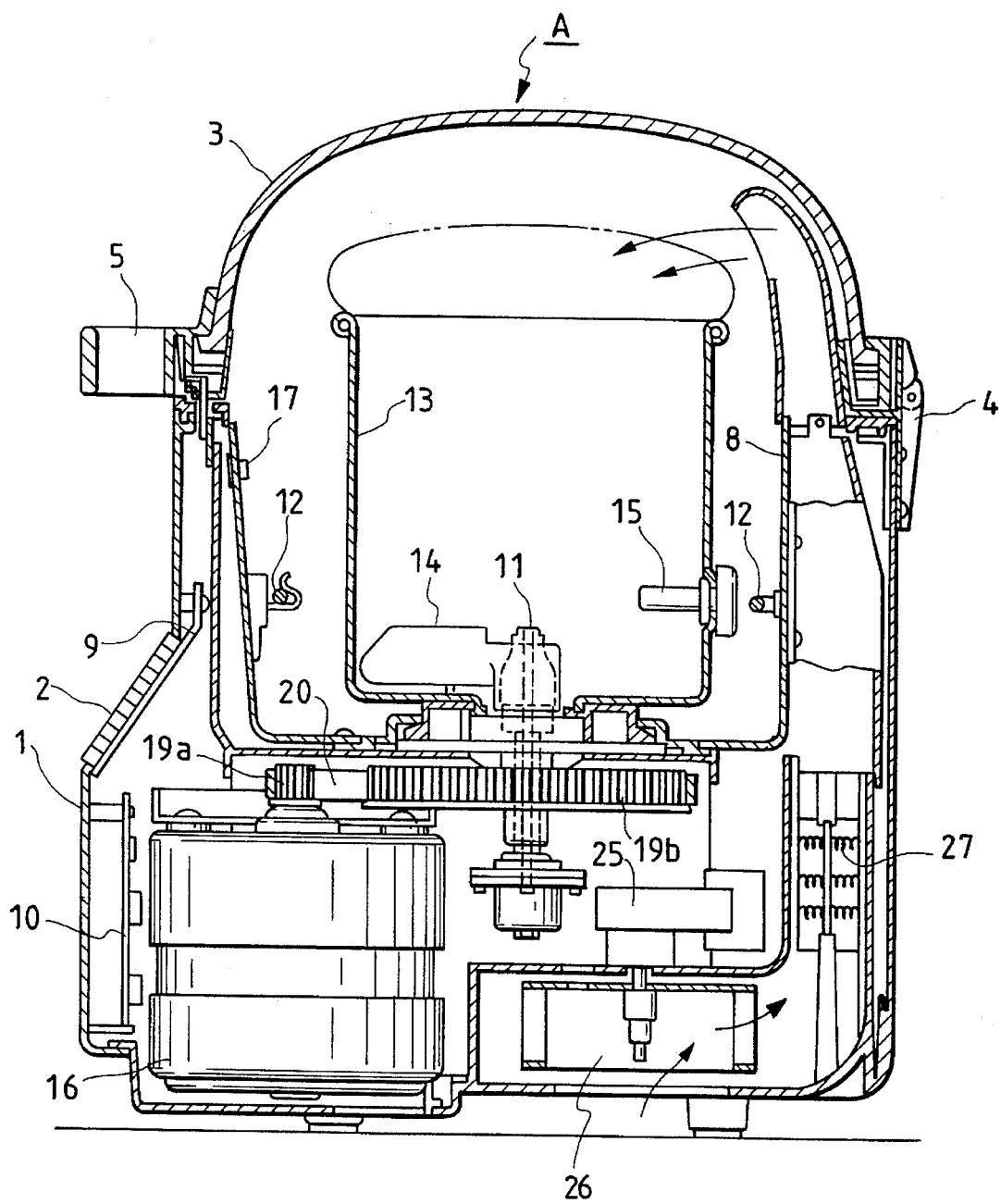
FIG. 8 is a sectional view showing a construction of a conventional bread maker.

The second embodiment of the invention will be described next. A bread maker C, which is the second embodiment of the invention, has an internal temperature sensor 17c mounted at such a position as not only to implement temperature control with satisfactory response and high accuracy but also to make high-quality bread. FIG. 5 is a sectional view showing a construction of the bread maker C. In FIG. 5, the same or like parts and components as those shown in FIG. 8 are designated by the same reference numerals, and the description thereof will be omitted. The internal temperature sensor 17c is mounted at a point C that coincides with the first quarter from below when the distance between the uppermost point U (the lower end of an opening/closing cover 3) and the mounting point D of the heater 12 is quartered.

It may be noted that points A and B denote the third quarter and the second quarter from below, respectively.

Figure 6A:
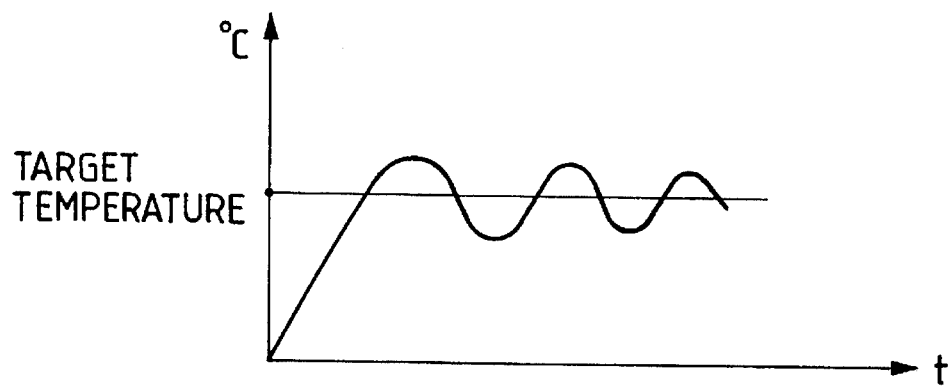
FIGS. 6(a) to 6(c) are diagrams showing temperature control characteristics in function of the mounting position of an internal temperature sensor of the bread maker shown in FIG. 5.
Figure 6B:
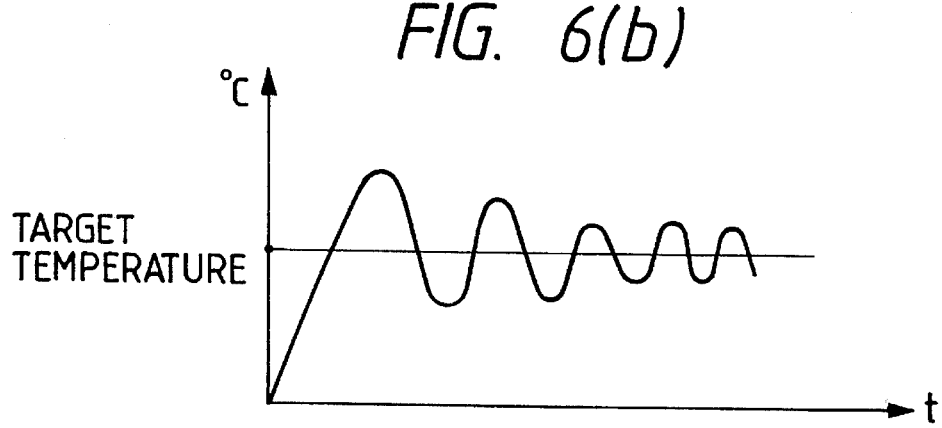
Figure 6C:
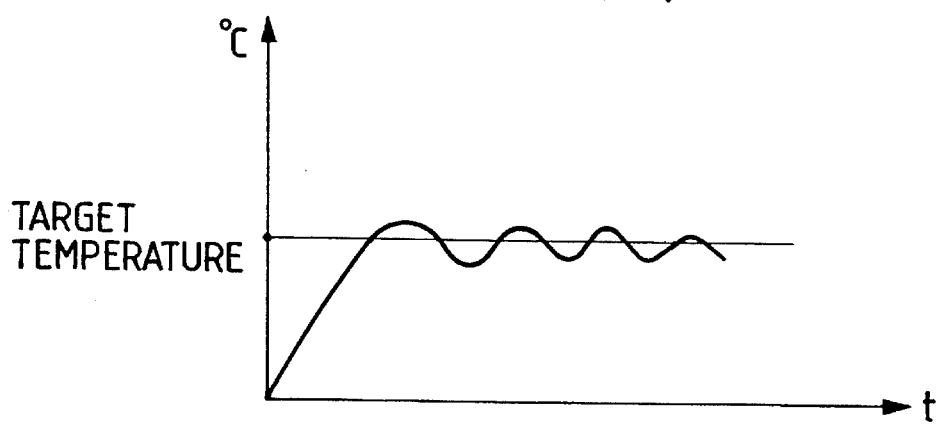

FIGS. 6(a) to 6(c) show temperature control characteristic curves obtained when the internal temperature sensor 17c is mounted at points A, C, and D. The characteristic curve shown in FIG. 6(a) is obtained when the internal temperature sensor 17c is mounted at point A; the characteristic curve shown in FIG. 6(b) is obtained when the internal temperature sensor 17c is mounted at point D; and characteristic curve shown in FIG. 6(c) is obtained when the internal temperature sensor 17c is mounted at point C.

The characteristic curve shown in FIG. 6(a) exhibits poor response due to the fact that the internal temperature sensor 17c is remote from the heater 12. Therefore, this characteristic curve exhibits the number of times of heater-on/off operations smaller than that of the characteristic curves shown in FIGS. 6(b) and 6(c), with large overshoot and undershoot.

The characteristic curve shown in FIG. 6(b) exhibits satisfactory response. However, too intense direct heating due to the fact that the internal temperature sensor 17c is located close to the heater 12 makes overshoot and undershoot large. This characteristic curve has the number of times of heater-on/off operations larger than that of the characteristic curves shown in FIGS. 6(a) and 6(c), contributing to better response but increasing overshoot as well.

In contrast to the characteristic curves shown in FIGS. 6(a) and 6(b), the characteristic curve shown in FIG. 6(c) exhibits the smallest overshoot and undershoot with response being in between those of the curves shown in FIGS. 6(a) and 6(b) in accordance with the number of heater-on/off operations. The fluctuation range is also minimized at the steady state. Therefore, the optimal mounting position for the internal temperature sensor 17c is in the vicinity of point C at which the curve shown in FIG. 6(c) is obtained.

FIG. 7 shows a data table for making a general judgment of the mounting point of the internal temperature sensor 17c out of points A, B, C and D so that the optimal temperature control characteristic can be obtained. For example, evaluation points are set for each judgment item in such a manner that two points are given for a temperature fluctuation range of ±7° to ±6.5° C.; one point is given for a temperature fluctuation range of ±7° to ±7° C.; three points are given for a temperature fluctuation range of ±7° to ±6° C.; no point is given for a temperature fluctuation range of ±15° to ±12.5° C. at a sensor point; and so on. The mounting position of the internal temperature sensor 17c at which the highest evaluation points are given is judged as the optimal mounting position through general analysis of the respective judgment items. For example, point C is selected as the optimal mounting position. In other words, the optimal mounting position can be found in the area around point C. The temperature control characteristic at point C exhibits, as shown in FIG. 6(c), a narrow temperature fluctuation range. That is, the temperature is constantly controlled within a prescribed temperature range.

Further, for each point, if a value $X_1$ minus $X_2$ ($X_1-X_2$) is calculated where X denotes the number of times of turning on the heater for a predetermined period and $X_2$ denotes the maximum value (absolute value) of the temperature fluctuation range, it is determined that a point where this value is substantially the largest is the optimal mounting position for the internal temperature sensor 17c. That is, as shown in FIG. 7, the value is 10–7=3 when the sensor 17c is mounted at point A; 14–7=7 at point B; 16–7=9 at point C; and 19–15=4 at point D. Thus, it is determined that point C is the optimal mounting position for the sensor 17c.

As described in the foregoing, the invention can provide the following advantages.

Heater control (i.e., the turning on and off of a heater) can be effected by an internal temperature sensor in such a manner that a reference value corresponding to a target temperature is updated on a heater-on/off operation basis so as not only to anticipate turn-on and turn-off timings but also to vary the amount of anticipation. Therefore, overshoot and undershoot with respect to the target temperature can be controlled. In addition, the temperature fluctuation range can be minimized for the heater-on/off control at the steady state, allowing temperature control with satisfactory response and high accuracy to be obtained.

Moreover, the internal temperature sensor is mounted at a position where a value obtained by subtracting the maximum value of the temperature fluctuation range from the number of times of turning on the heater for a predetermined period is substantially the largest. This means that the internal temperature sensor is mounted at a position above the heater mounting position, so that not only the sensor is close to the bread making ingredients to be heated by the heater, but also the sensor is not exposed to direct heating by the heater. As a result, overshoot and undershoot are minimized compared with those observed when the internal temperature sensor is arranged at other positions, and temperature fluctuation range is also minimized during the heater-on/off control at the steady state. Hence, temperature control with satisfactory response and high accuracy can be implemented.

What is claimed is:

1. A bread maker comprising:

a baking oven main body;

a bread baking case set in said baking oven main body;

a heater for heating said bread baking case;

an internal temperature sensor for detecting a heating temperature of said bread baking case;

temperature control means for comparing a current value of the heating temperature with a reference value corresponding to a target temperature and performing a heater-on/off control operation based on a difference between the current value of the heating temperature and the reference value to adjust the current value to the target temperature, said temperature control means controlling the heating temperature in a mixing and kneading process, a fermenting process, and a baking process; and reference value setting means for updating the reference value corresponding to the target temperature so as to be a different value from the target temperature every heater-on/off control operation, to cause the reference value to turn off said heater before the heating temperature reaches the target temperature when the heating temperature is increasing based on the heater-on control operation, and to cause the reference value to turn on said heater before the heating temperature reaches the target temperature when the heating temperature is decreasing based on the heater-off control operation.

2. The bread maker according to claim 1, wherein said reference value setting means includes memory means in which a table of the updated reference values for every heater-on/off operation has been stored in advance.

3. The bread maker according to claim 1, wherein said reference value setting means updates the reference value so that a difference between the updated reference value and the target temperature decreases with increasing number of times of the heater-off operations.

4. The bread maker according to claim 1, wherein said reference value setting means updates the reference value so that a difference between the updated reference value and the target temperature decreases with increasing number of times of the heater-on operations.

5. A bread maker comprising:

a baking oven main body;

an opening/closing cover mounted on an uppermost end of said baking oven main body;

a bread baking case set in said baking oven main body;

a heater for heating said bread baking case;

an internal temperature sensor for detecting a heating temperature of said bread baking case; and temperature control means for comparing a current value of the heating temperature with a reference value corresponding to a target temperature, and performing a heater-on/off control operation based on a difference between the current value of the heating temperature and the reference value, to adjust the current value to the target temperature, wherein said internal temperature sensor is mounted at a position where a value obtained by subtracting a maximum value of a temperature fluctuation range of the heating temperature with respect to the target temperature from the number of times of turning on said heater for a predetermined period is substantially the largest.

* * * * *